United States Patent
Burchard et al.

(10) Patent No.: US 12,229,775 B2
(45) Date of Patent: Feb. 18, 2025

(54) PSEUDONYMOUS TRANSACTIONS ON BLOCKCHAINS COMPLIANT WITH KNOW YOUR CUSTOMER REGULATIONS AND REPORTING REQUIREMENTS

(71) Applicant: Goldman Sachs & Co. LLC, New York, NY (US)

(72) Inventors: Paul Burchard, Jersey City, NJ (US); Fabiano Romeiro, London (GB); Marco Argenti, Jersey City, NJ (US); Raj Mahajan, New York, NY (US); Anthony Daoud, New York, NY (US); Dominic Dotterrer, New York, NY (US); Lachlan Maxwell, Ashburn, VA (US); Rahul Sharma, San Jose, CA (US)

(73) Assignee: Goldman Sachs &Co. LLC, New York, NY (US)

( * ) Notice: Subject to any disclaimer, the term of this patent is extended or adjusted under 35 U.S.C. 154(b) by 183 days.

(21) Appl. No.: 17/970,488

(22) Filed: Oct. 20, 2022

(65) Prior Publication Data
US 2023/0117344 A1    Apr. 20, 2023

Related U.S. Application Data

(60) Provisional application No. 63/337,391, filed on May 2, 2022, provisional application No. 63/316,931, filed
(Continued)

(51) Int. Cl.
*G06Q 20/40* (2012.01)
*H04L 9/00* (2022.01)
(Continued)

(52) U.S. Cl.
CPC ....... *G06Q 20/4014* (2013.01); *H04L 9/0643* (2013.01); *H04L 9/321* (2013.01);
(Continued)

(58) Field of Classification Search
CPC ... G06Q 20/4014; H04L 9/0643; H04L 9/321; H04L 9/3263; H04L 9/50
See application file for complete search history.

(56) References Cited

U.S. PATENT DOCUMENTS 8,316,237 B1 * 11/2012 Felsher ................ H04L 63/061
                                                       380/282
10,963,582 B1 * 3/2021 McCown .............. G06F 21/602
(Continued)

FOREIGN PATENT DOCUMENTS

WO    WO 2021/016702 A1    2/2021

OTHER PUBLICATIONS

Jamal, Arshad, et al. "Blockchain-based identity verification system." 2019 IEEE 9th international conference on system engineering and technology (ICSET). IEEE, 2019.*
(Continued)

*Primary Examiner* — Jimmy H Tran
(74) *Attorney, Agent, or Firm* — Fenwick & West LLP; Daniel R. Brownstone (57) ABSTRACT

A method for compliance with Know Your Customer (KYC) and other regulations includes a pseudonymous globally unique identifier stored on a blockchain that associates a pseudonymous first party address with a globally unique identifier representing the vetted identity of the owner of the address. The method also includes a trusted third party issuing a verifiable credential for a first pseudonymous party to a proposed transaction to a second pseudonymous party to the transaction.

19 Claims, 3 Drawing Sheets

Related U.S. Application Data on Mar. 4, 2022, provisional application No. 63/281,534, filed on Nov. 19, 2021, provisional application No. 63/263,866, filed on Nov. 10, 2021, provisional application No. 63/274,925, filed on Nov. 2, 2021, provisional application No. 63/257,977, filed on Oct. 20, 2021.

(51) Int. Cl.
   *H04L 9/06* (2006.01)
   *H04L 9/32* (2006.01)

(52) U.S. Cl.
   CPC .............. *H04L 9/3263* (2013.01); *H04L 9/50* (2022.05); *H04L 2209/56* (2013.01)

(56) References Cited

U.S. PATENT DOCUMENTS

| | | | | |
|---|---|---|---|---|
| 2004/0111379 | A1* | 6/2004 | Hicks | G06Q 20/00 705/76 |
| 2005/0257045 | A1* | 11/2005 | Bushman | H04L 63/12 713/156 |
| 2007/0106892 | A1* | 5/2007 | Engberg | H04L 9/0825 713/168 |
| 2015/0356523 | A1* | 12/2015 | Madden | G06Q 20/383 705/76 |
| 2016/0034896 | A1* | 2/2016 | O'Brien | G06Q 20/227 705/37 |
| 2017/0161737 | A1* | 6/2017 | Benson | H04L 9/3268 |
| 2018/0137512 | A1* | 5/2018 | Georgiadis | H04L 63/08 |
| 2018/0191688 | A1* | 7/2018 | Chen | H04L 9/3226 |
| 2018/0240107 | A1* | 8/2018 | Andrade | G06Q 20/065 |
| 2018/0268386 | A1* | 9/2018 | Wack | G06Q 20/02 |
| 2019/0188706 | A1* | 6/2019 | McCurtis | H04L 9/3239 |
| 2019/0222424 | A1* | 7/2019 | Lindemann | H04L 9/0861 |
| 2019/0333054 | A1* | 10/2019 | Cona | H04W 12/06 |
| 2020/0127828 | A1* | 4/2020 | Liu | H04L 9/30 |
| 2020/0133955 | A1* | 4/2020 | Padmanabhan | G06Q 30/01 |
| 2020/0143019 | A1* | 5/2020 | Chen | H04L 9/0643 |
| 2020/0334379 | A1* | 10/2020 | Derosa-Grund | G06F 21/645 |
| 2021/0027404 | A1* | 1/2021 | de Bold | G06Q 50/18 |
| 2021/0042836 | A1 | 2/2021 | Doney et al. | |
| 2021/0073804 | A1* | 3/2021 | Kikinis | G06Q 20/3276 |
| 2021/0126794 | A1* | 4/2021 | Forrester | G06F 21/64 |
| 2021/0144011 | A1* | 5/2021 | Yang | H04L 9/3239 |
| 2021/0166245 | A1* | 6/2021 | Novotny | H04L 67/1078 |
| 2021/0192520 | A1* | 6/2021 | Patel | G06Q 20/02 |
| 2021/0226774 | A1* | 7/2021 | Padmanabhan | H04L 9/0643 |
| 2021/0286868 | A1* | 9/2021 | Kragh | H04L 9/3247 |
| 2021/0304200 | A1 | 9/2021 | Doney et al. | |
| 2021/0350343 | A1* | 11/2021 | Gaur | G06Q 20/027 |
| 2021/0350891 | A1* | 11/2021 | Dods | G16H 10/60 |
| 2021/0366586 | A1* | 11/2021 | Ryan | G06Q 20/3224 |
| 2021/0377254 | A1* | 12/2021 | Avetisov | H04L 67/133 |
| 2021/0377263 | A1* | 12/2021 | Law | H04L 9/3073 |
| 2022/0029810 | A1* | 1/2022 | Tang | H04L 9/3239 |
| 2022/0058622 | A1* | 2/2022 | Snow | G06Q 20/0658 |
| 2022/0076250 | A1* | 3/2022 | Gaur | G06Q 20/3829 |
| 2022/0393881 | A1* | 12/2022 | Ow | G06Q 20/3678 |
| 2022/0405765 | A1* | 12/2022 | Bekiyants | H04L 63/0861 |
| 2023/0080322 | A1* | 3/2023 | Smith | H04L 9/3265 726/7 |
| 2023/0095123 | A1* | 3/2023 | Fournier | G06F 21/6245 713/176 |
| 2023/0230091 | A1* | 7/2023 | Vaughn | G06Q 20/4016 705/71 |
| 2023/0315904 | A1* | 10/2023 | Lemieux | H04L 9/3218 705/3 |
| 2023/0342849 | A1* | 10/2023 | Doney | G06Q 20/3678 |
| 2023/0360042 | A1* | 11/2023 | Doney | G06Q 20/065 |
| 2024/0005397 | A1* | 1/2024 | Jette | G06Q 40/03 |
| 2024/0104521 | A1* | 3/2024 | Azgad-Tromer | G06Q 20/382 |

OTHER PUBLICATIONS

Kilt Protocol White Paper [Online]. KILT Protocol https://kilt-protocol.org/files/KILT-White-Paper.pdf. Version Jan. 15, 2020.*

Bhattacharya, M. P. et al. "Enhancing the Security and Privacy of Self-Sovereign Identities on Hyperledger Indy Blockchain." 2020 International Symposium on Networks, Computers and Communications (ISNCC), Oct. 20-22, 2020, pp. 1-7.

Dunphy, P. et al. "A First Look at Identity Management Schemes on the Blockchain." IEEE Security & Privacy, vol. 16, No. 4, Jul./Aug. 2018, pp. 20-29.

Lesavre, L. et al. "A Taxonomic Approach to Understanding Emerging Blockchain Identity Management Systems." White Paper, National Institute of Standards and Technology: Computer Security Resource Center (NIST CSWP), Jan. 14, 2020, pp. i-56.

PCT International Search Report and Written Opinion, PCT Application No. PCT/IB2022/060114, Feb. 1, 2023, 10 pages.

Wang, F. et al. "Self-Sovereign Identity in a Globalized World: Credentials-Based Identity Systems as a Driver for Economic Inclusion." Frontiers in Blockchain: Hypothesis and Theory, vol. 2, Article 28, Jan. 2020, pp. 1-22.

* cited by examiner

PSEUDONYMOUS TRANSACTIONS ON BLOCKCHAINS COMPLIANT WITH KNOW YOUR CUSTOMER REGULATIONS AND REPORTING REQUIREMENTS

CROSS REFERENCE TO RELATED APPLICATIONS

This application claims the benefit of U.S. Provisional Application Nos. 63/257,977, filed Oct. 20, 2021, 63/274,925, filed Nov. 2, 2021, 63/263,866, filed Nov. 10, 2021, 63/281,534, filed Nov. 19, 2021, 63/316,931, filed Mar. 4, 2022, and 63/337,391, filed May 2, 2022, all of which are incorporated by reference.

TECHNICAL FIELD

This disclosure relates generally to blockchains and, in particular, to the use of decentralized identification, non-fungible tokens, verifiable credentials, and smart contracts that enable Know-Your-Customer-compliant pseudonymous transactions.

BACKGROUND

Distributed ledgers were developed as a means for parties to engage in transactions, e.g., financial transactions, without the need for a single, trusted intermediary. In such systems, each transaction is recorded independently by several nodes (e.g., on a blockchain). In some implementations, no one entity controls all of the nodes so it is exceedingly difficult for a malicious actor to alter the transaction once it has been recorded by the nodes. Even in implementations where a single entity controls all of the nodes, it is still exceedingly difficult to alter the data recorded on sufficient nodes to change the consensus indicated by all of the nodes without leaving an indication that the data has been tampered with. The use of blockchains has expanded beyond the original purpose to other use cases, such as providing proof of data provenance, smart contracts, and non-fungible tokens (NFTs) representing digital artwork.

SUMMARY

Blockchains are a technology that enables real time settlement of pseudonymous transactions. The pseudonymity has benefits, but it may prevent entities from both complying with Know Your Customer (KYC) regulations and producing materials to satisfy regulatory reporting requirements. Existing solutions break the pseudonymity of the blockchain by exchanging identifying information off-chain between the parties to the transaction and a KYC provider.

The process of KYC validation is based on regulatory requirements and the internal policies of the financial institution performing the validation. Typical validation processes collect and verify public information of the entity such as entity jurisdiction, physical address, and beneficial ownership, along with private information such as entity holdings or the line of business the entity is attempting to engage in. The purpose of the KYC validation is to certify several criteria pertaining to the certified party's transaction capacity, authority, and suitability.

Verifying KYC compliance is a regulatory requirement for many parties seeking to transact. However, direct exchange of KYC validation credentials between otherwise pseudonymous counterparties has the potential to compromise the pseudonymity of the transaction. Furthermore, transaction reporting requirements may also require parties to exchange identifying information.

In various embodiments, a trusted third party to each transaction provides certification of compliance of that transaction with regulations. The first and second party to the transaction remain pseudonymous with respect to each other. The trusted third party knows the true identity of the first party and performs due diligence on that first party sufficient to certify compliance with applicable regulations. These applicable regulations can include Know Your Customer (KYC) and Anti-Money Laundering (AML). The trusted third party then issues a credential to the second party, upon request of the first party, that certifies compliance of a proposed transaction with applicable regulations. In one embodiment, the credential reveals no information about the first party beyond a compliance/suitability score (which could be a YES/NO or a numerical score). The second party can retain the credential for their records to present to regulatory authorities.

As the first and second party remain pseudonymous, they will only be known to each other by pseudonymous globally unique identifiers (GUIDs). These identifiers can be standards-compliant Decentralized Identifiers (DIDs) or Non-Fungible Tokens (NFTs). The trusted third party issues credentials for transactions referring to the first party using these GUIDs. The credential issued by the trusted third party certifying compliance of the transaction in question can be a Verifiable Credential (VC) that cryptographically ensures the validity of the credential.

In one embodiment, the second party to the transaction is a smart contract. In this case, there is no need for a symmetric credential for the second party to deliver to the first.

For transaction reporting requirements, the trusted third party can issue encrypted identifying information about the first party that is decryptable only by the regulatory agency that requires the reporting. Thus, the first party remains pseudonymous except with regard to the regulatory agency.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Systems

Figure 1:
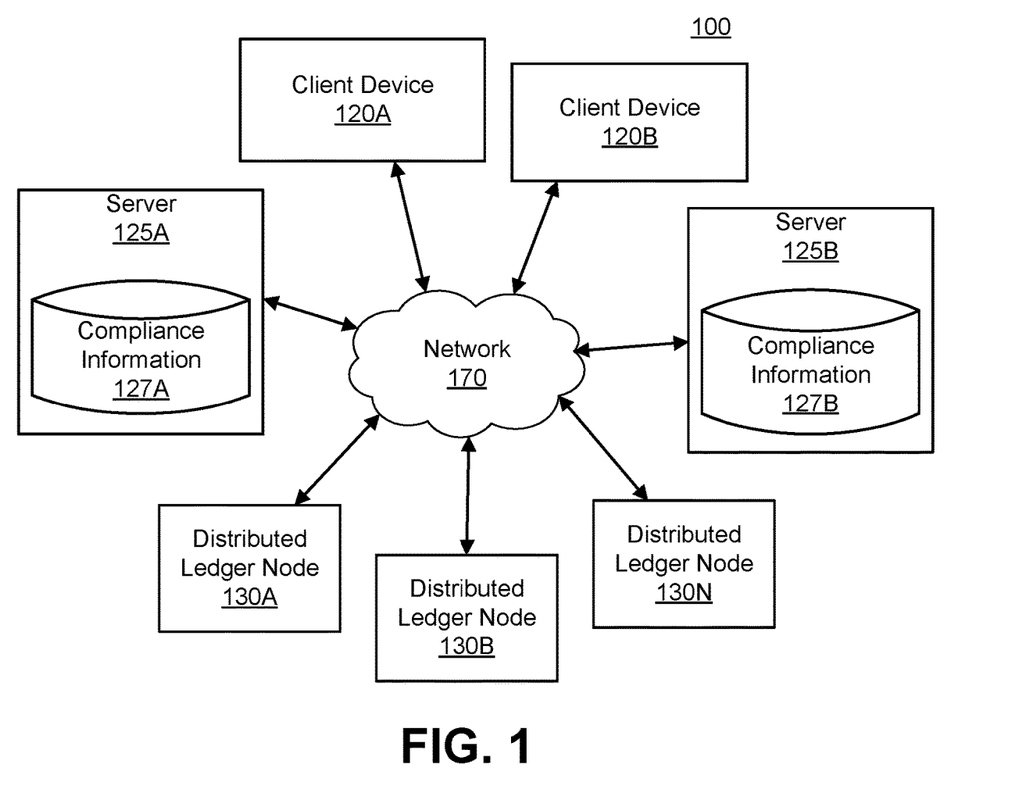
FIG. 1 illustrates a networked computing environment suitable for providing KYC certification through the use of DIDs or identifying NFTs and verifiable credentials that enables pseudonymous compliant transactions, according to one embodiment.

FIG. 1 illustrates one embodiment of a networked computing environment 100 suitable for providing access to a distributed blockchain ledger supporting Decentralized IDs (DIDs) or Non-Fungible Tokens (NFTs). Compliance validation of a first party by a trusted third party for a particular transaction is based on applicable regulatory requirements, the internal policies of the trusted third party performing the validation, and the types of transaction that the first party seeks to pursue. Compliance certification can be validated on a per-transaction basis and is dependent on the details of that transaction.

Typical validation processes by the trusted third party collect and verify information from both public and private sources. The type of information collected depends on several factors such as entity jurisdiction, physical address, beneficial ownership, along with private information such as entity holdings or the line of business the entity is attempting to engage in. The purpose of the compliance validation is to certify several criteria pertaining to the certified party's transaction capacity, authority, suitability, and, if applicable, anti-money laundering (AML) constraints.

Know-Your-Customer (KYC) validation is typically completed using conventional methods and human oversight. However, the results of the validation are confidentially stored by the trusted third party for reference and compliance certification for a particular transaction can be algorithmically checked using a rule-based system which generates a filtered list of requirements based on the transaction and then checks the satisfaction of those requirements based on designated criteria determined during the foregoing KYC process.

KYC validation may be periodically recertified (typically between 6 months to 5 years depending on factors such as jurisdiction). For this reason, the issued DIDs or identifying NFTs signifying KYC validation may be retractable by the issuing institution or have an explicit expiry date.

In the embodiment shown in FIG. 1, the network computing environment includes client devices 120, servers 125, and distributed ledger nodes 130A-N, all connected via a network 170. Although two client devices 120 (e.g., a first party device 120A and a second party device 120B) and three distributed ledger nodes 130 are shown, the networked computing environment 100 may include any number of each type of device (and will typically contain many more of each). Similarly, although two servers 125 are shown, the environment 100 may include any number of servers 125. In other embodiments, the networked computing environment 100 includes different or additional elements. In addition, the functions may be distributed among the elements in a different manner than described.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

A client device 120 is a computing device with which a user may engage in transactions with other users. The transactions may be anonymous between the users. In one embodiment, the client device 120 provides a user interface (e.g., in an app or portal displayed via a web browser). Using the user interface, the user may initiate, negotiate, and/or agree to transactions.

The distributed ledger nodes 130 are computing devices that record information in blocks on a blockchain. Blocks can include data describing transactions (e.g., cryptocurrency payments), smart contracts, NFTs, or any other data that the blockchain is configured to store. The distributed ledger nodes 130 may use a consensus algorithm, such as Byzantine fault tolerance, to determine when recorded information is considered reliable. In one embodiment, a trusted third party, after verifying the identify of an entity according to its internal procedures, mints an NFT that is stored on the blockchain and serves as a verified credential for the entity. The NFT may include a pointer or link to compliance information 127 for the entity. For example, the trusted third party may be the entity's financial institution (e.g. a bank) and the entity's compliance information 127 may include suitability data stored at a server 125 of the entity's financial institution. The compliance information may be anonymized such that parties accessing it can determine whether the entity meets compliance requirements without knowing the identity of the entity.

A financial institution server 125 is a computing device which facilitates access to the relevant databases internal to the third party (e.g., compliance information 127), which in turn reference the identity of the holder of a GUID issued by that third party (in the form of a DID or NFT) and relevant data collected during the third party's KYC validation process for the GUID holder. For example, a trusted third party can perform a conventional KYC verification process for an external entity. The information collected is then confidentially retained and the third party can direct the server 125 with access to the distributed ledger to mint either a DID on a public ID register, or NFT on the blockchain itself, either of which represents the identifying GUID, along with reference to the blockchain address associated to that entity and reference to the DID which publicly identifies the third party as the trusted minting party. The GUID identifies the holder of the blockchain address to the minting party but does not convey any identifying information to other parties. Upon request of the first party, the financial institution can issue verifiable credentials which signifies that (or the degree to which) the data collected during the KYC process certifies compliance verification of the entity for engagement with a particular blockchain transaction or smart contract in question. The credential may be issued directly to the second party or to the first party who can then provide (e.g., transmit) it to the second party.

When a transaction is proposed between pseudonymous counterparties and the counterparties agree to engage in the transaction, a smart contract may be used to ensure the transaction completes as agreed to by all parties. The counterparties provide the assets they agreed to trade to the smart contract, which are held within the contract until either all parties have provided the required assets and verifiable credentials and the transaction is approved or the transaction is rejected. In some embodiments, this transaction may execute as soon as all parties have provided the necessary assets to the transaction. In some embodiments, the smart contract can be minted on the blockchain as a service by the third party verifying KYC compliance. Execution of the smart contract can automatically trigger production of appropriate documentation as described below.

In one embodiment, the first party—having completed KYC verification with a given trusted third party and having been provided the DID or identifying NFT by that party—may seek to engage in a transaction with one or more other parties through a smart contract (the second party) on the blockchain. The first party may request compliance verification for a transaction through a call to an external API maintained by the third party. Upon this API call of the first party, and having provided in the call the location of the smart contract on the blockchain (or details of the contract via a configuration file), the trusted third party can provide verifiable credentials referencing three pieces of information: the DID of the engaging party, the DID of the trusted third party, and either an affirmation that the engaging party meets compliance criteria for engaging with the smart contract (or transaction with the second party) in question or a score that indicates risk levels with regard to compliance uncertainty. In this way, the pseudonymity of the first and second parties is preserved, as the second party only receives verifiable credentials from the trusted third party that verifies that the holder of particular blockchain address meets the requirements of the transaction. Notably, the transaction can be completed with minimal information that may be used to identify the parties being exchanged between pseudonymous parties. Specifically, in one embodiment, the information exchanged is a verifiable identification of the certifying trusted party, the blockchain address which has been KYC verified, and the scoring of compliance for the proposed transaction. Thus, each party need not (and does not) know the identity of the other, but can engage in the transaction with confidence that the trusted third party has verified the other party is suitable for the transaction. The verifiable credentials can be stored on-chain or off-chain, depending on the specific embodiment (e.g., the verifiable credentials can themselves be a smart contract or NFT stored on a blockchain that may be accessed by s smart contract implementing a transaction).

In other embodiments, the verifiable credentials issued by the third party upon request of the first party can be conditional on the submission of similar verifiable credentials of other parties to the smart contract. In one such embodiment, the trusted institution may mint verifiable credentials for the first party and place them in a newly minted smart contract which releases the first party's VCs only upon receipt of similar VCs from all entities comprising the second party engaged in the transaction. In another embodiment, the third party may simply provide an API and appropriate credentials which allow the second party to submit similar (possibly contingent) VCs to the trusted third party and receive the VCs of the first party directly on the blockchain or through the institution's API set through which the original request was made.

In one embodiment, the DID or identifying NFT may contain an encrypted public identifier (such as an encrypted tax ID) to which only appropriate regulatory agencies possess the private key for decryption. In this way, the regulatory agency can associate the identity of the DID of NFT holder to a known party without requiring the trusted third party as an intermediary. In another embodiment, the minting trusted party can provide documentation for regulatory or tax reporting upon completion of the transaction. Execution of the smart contract is easily verified on the blockchain through standard methods and the engaged parties are identified with their respective GUIDs. The reporting documentation can be compiled by the trusted third party and encrypted so that anonymity of the counterparties is preserved while allowing the appropriate regulatory agencies who possess the private key to decrypt the documents upon receipt. The reporting to the regulatory agency may include a reference to and details of the VCs supplied by all parties to the transaction, along with reference to the KYC verification completed by the third party. In other embodiments, the encrypted reporting documentation can be referenced directly on the blockchain in the form of verifiable credentials stored as an NFT or smart contract. In this way, both entities engaged in the transaction can meet regulatory requirements which require reporting the identity of all counterparties to the smart contract without themselves discovering that identity.

To protect the pseudonymity of an entity that is eligible for the GUIDs, the trusted third party may issue multiple distinct GUIDs. These GUIDs all reference the same entity within the records of the trusted third party. These GUIDs—whether as DIDs on a public register or as NFTs containing reference to a particular verified blockchain address—can each reference a different blockchain address and the first party can conduct transactions from any number of those addresses in order to help preserve pseudonymity.

In other embodiments, the smart contract may require as a condition for execution that any transactions first receive required verifiable credentials generated by trusted parties that collectively performed KYC validation on the parties engaging with the smart contract. These verifiable credentials are produced to the KYC compliance of the transaction for all parties to the smart contract or party-to-party transaction—that possess institution-provided GUIDs. These specially formatted smart contracts functionally serve as both the framework for the transaction and as the release criteria for verifiable credentials discussed in previous claims.

High frequency trading systems are currently unable to verify KYC compliance or assess the suitability of pseudonymous counterparties to blockchain-based trades. This is because no manual or human-based compliance or suitability verification system could possibly process the transactions in a timely manner. However, utilizing smart contracts as described above, verifiable credentials for a given smart contract can be requested and generated automatically and algorithmically by verifying details of the transaction. If all engaging parties must be KYC verified, contingent verifiable credentials can be issued, which rely on the submission of suitable verifiable credentials from all transacting parties, as described in previous claims. In doing so, high frequency algorithmic trading can be achieved in a pseudonymous, KYC-compliant manner, which is impossible with conventional methods.

The smart contracts described additionally allow the minting trusted party to verify completion of the transaction, as it is publicly recorded on the blockchain. Upon completion of the transaction, the minting trusted party may update their internal data with the transaction details, which may affect future KYC or AML certification criteria. For example, repeated transactions of a particular type may increase or decrease a party's scope of compliance for future transactions of the same type.

The determination of KYC compliance for an entity depends upon the aforementioned required confidential entity information and is dependent on factors including but not limited to relevant regulation with respect the entity, relevant regulation with respect to the transaction type, and internal risk tolerance measures. Compliance verification is offered in reference to the transaction and is dependent on its details. Verifiable credentials issued on behalf of the first party are provided relative to a particular smart contract.

Note that the present disclosure is not intended to address regulatory or other requirements and obligations that may be present in various jurisdictions.

Computing System Architecture

Figure 2:
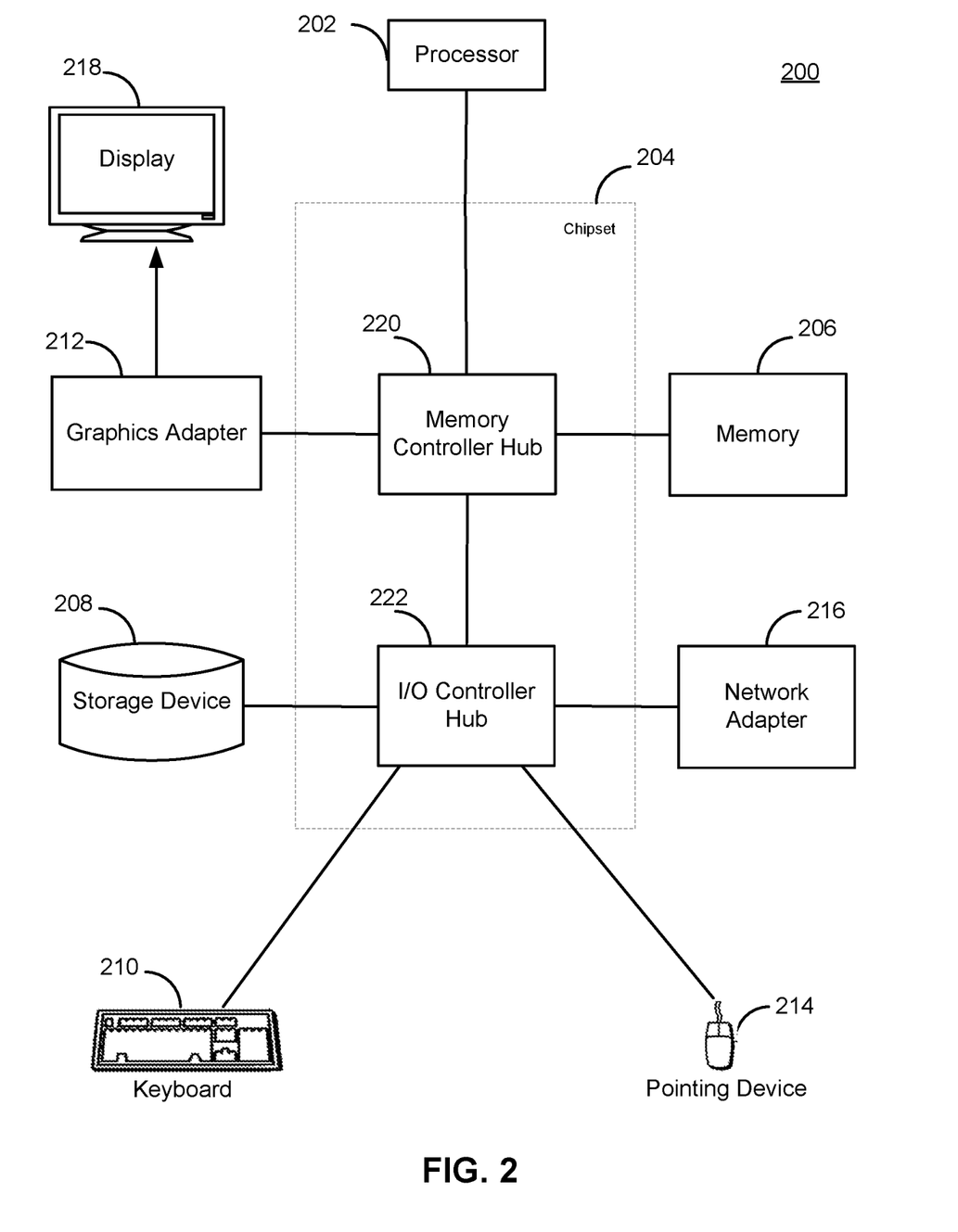
FIG. 2 is a block diagram illustrating an example of a computer suitable for use in the networked computing environment of FIG. 1, according to one embodiment.

FIG. 2 illustrates an example computer 200 suitable for use as a trusted third party device 110, first or second party device 120, or distributed ledger node 130, according to one embodiment. The example computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

In the embodiment shown in FIG. 2, the storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, touch-screen, or other type of pointing device, and is used in combination with the keyboard 210 (which may be an on-screen keyboard) to input data into the computer system 200. The graphics adapter 212 displays images and other information on the display 218. The network adapter 216 couples the computer system 200 to one or more computer networks (e.g., network 170). The types of computers used by the entities of FIG. 1 can vary depending upon the embodiment and the processing power required by the entity. Furthermore, the computers can lack some of the components described above, such as keyboards 210, graphics adapters 212, and displays 218.

Example Method

Figure 3:
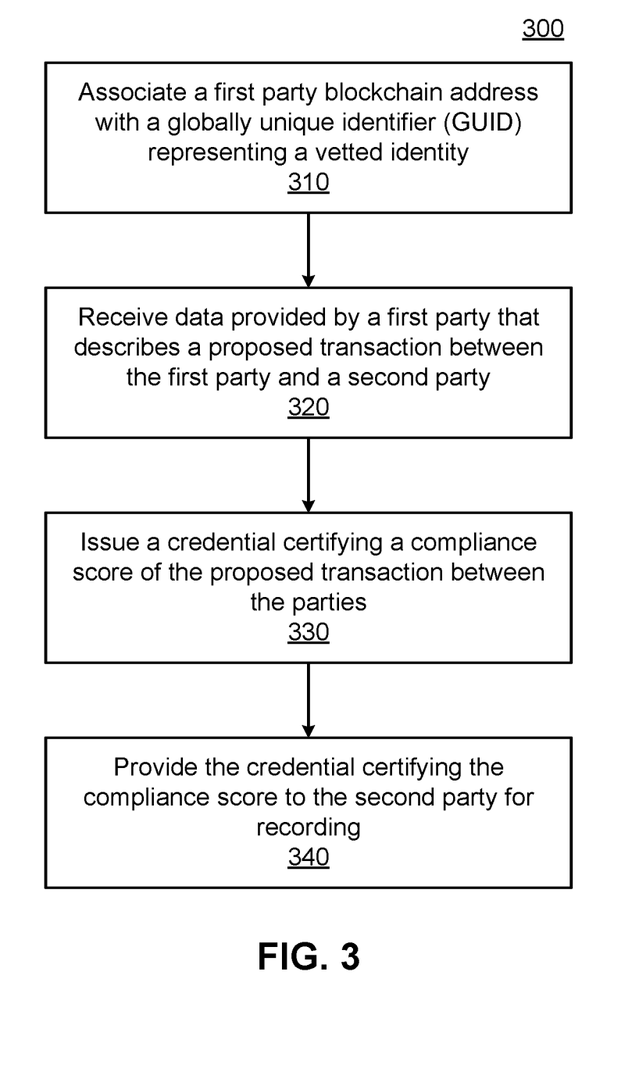
FIG. 3 is a flowchart illustrating a method for providing verified credentials for certifying compliance of a transaction with Know Your Customer (KYC), Anti-Money Laundering (AML), and/or other regulations, according to one embodiment.

FIG. 3 illustrates one embodiment of a method 300 for certifying compliance of a transaction with Know Your Customer (KYC), Anti-Money Laundering (AML), and/or other regulations on a blockchain without compromising the pseudonymity of the parties to the transaction. The method 300 is shown from the perspective of a server 125 performing the method. However, some or all of the steps may be performed by other entities. Furthermore, other embodiments of the method 300 include different or additional steps.

In the embodiment shown in FIG. 3, the method 300 begins with the server 125 associating 310 a first party blockchain address with a globally unique identifier (GUID) representing a vetted identity. A service hosted by a trusted third party receives 320 data describing a proposed transaction between the parties. The data may be provided by a first party of the parties to the proposed transaction. The server 125 issues 330 a credential certifying a compliance score for KYC, AML, and/or other regulations of the proposed transaction between the parties. The credential may be issued as an automated output of the service. The server 125 provides 340 the credential certifying the compliance score for recording to a second party to the proposed transaction.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing KYC- and AML-compliant transactions using decentralized identification and verifiable credentials. This process preserves pseudonymity between counterparties and allows for appropriate regulatory reporting in doing so. Thus, while particular embodiments and applications have been illustrated and described, it is to be understood that the described subject matter is not limited to the precise construction and components disclosed. The scope of protection should be limited only by any claims that may ultimately issue.

What is claimed is:

1. A method for certifying compliance of a transaction with Know Your Customer (KYC), Anti-Money Laundering (AML), and/or other regulations on a blockchain without compromising the pseudonymity of parties to the transaction, the method comprising:
    associating a first party blockchain address on a blockchain with a globally unique identifier (GUID) representing a vetted identity of a first party;
    receiving, by a service hosted by a trusted third party, data describing a proposed transaction between the first party and a second party, the data provided by the first party;
    issuing, by the trusted third party to the second party, a credential certifying a compliance score for KYC, AML, and/or other regulations of the proposed transaction between the parties, the credential being issued as an automated output of the service, wherein the association between the GUID and the first party blockchain address is confirmed by another credential issued automatically to the first party by a trusted third party service; and
    providing, to the second party, the credential certifying the compliance score for recording.

2. The method of claim 1, wherein a real identity and private information of the first party are known only to the trusted third party, in such an amount as to enable certification of compliance with KYC, AML, and/or other regulations.

3. The method of claim 1, wherein the second party to the transaction is a smart contract on the blockchain, and the smart contract requires as input a credential certifying a compliance score for the first party that is sufficient to complete the proposed transaction.

4. The method of claim 1, wherein the compliance score for a particular regulation or collection of regulations is a binary YES/NO.

5. The method of claim 1, wherein the compliance score for a particular regulation or collection of regulations is a numerical value.

6. The method of claim 1, wherein the credential is issued directly to the first party that transmits the credential to the second party.

7. The method of claim 1, wherein the GUID is a Decentralized ID compliant with the World Wide Web Consortium (W3C) standard.

8. The method of claim 1, wherein the GUID is a Non-Fungible Token (NFT) owned by the first party blockchain address that is compliant with the Ethereum Foundation standard ERC-721.

9. The method of claim 1, wherein the GUID is the blockchain address of the first party.

10. The method of claim 1, wherein the credential is a Verifiable Credential compliant with the World Wide Web Consortium (W3C) standard.

11. The method of claim 1, wherein the another credential is a Verifiable Credential compliant with the World Wide Web Consortium (W3C) standard.

12. The method of claim 1, wherein a regulatory agency can verify a real identity of the first party using content associated with the globally unique identifier.

13. The method of claim 12, wherein the content associated to the globally unique identifier is salted and hashed identifying information, and the trusted third party provides the regulatory agency with the salt and identifying information, allowing the agency to verify that this hashes to the content associated to the globally unique identifier.

14. The method of claim 13, wherein confidential information associated with the globally unique identifier (GUID) is obtained by the second party from the service of the trusted third party in an encrypted form readable only by the regulatory agency to which the details of the transaction and each party must be reported.

15. A non-transitory computer-readable medium storing executable instructions that, when executed, cause a computing device to perform operations comprising:
    associating a first party blockchain address on a blockchain with a globally unique identifier (GUID) representing a vetted identity of a first party;
    receiving, by a service hosted by a trusted third party, data describing a proposed transaction between the first party and a second party, the data provided by the first party;
    issuing, by the trusted third party to the second party, a credential certifying a compliance score for KYC, AML, and/or other regulations of the proposed transaction between the parties, the credential being issued as an automated output of the service, wherein the association between the GUID and the first party blockchain address is confirmed by another credential issued automatically to the first party by a trusted third party service; and
    providing, to the second party, the credential certifying the compliance score for recording.

16. The non-transitory computer-readable medium of claim 15, wherein the second party to the transaction is a smart contract on the blockchain, and the smart contract requires as input a credential certifying a compliance score for the first party that is sufficient to complete the proposed transaction.

17. The non-transitory computer-readable medium of claim 15, wherein the credential is issued directly to the first party that transmits the credential to the second party.

18. The non-transitory computer-readable medium of claim 15, wherein a regulatory agency can verify a real identity of the first party using content associated with the globally unique identifier, and the content associated to the globally unique identifier is salted and hashed identifying information, and the trusted third party provides the regulatory agency with the salt and identifying information, allowing the agency to verify that this hashes to the content associated to the globally unique identifier.

19. The non-transitory computer-readable medium of claim 15, wherein confidential information associated with the globally unique identifier (GUID) is obtained by the second party from the service of the trusted third party in an encrypted form readable only by a regulatory agency to which the details of the transaction and each party must be reported.

* * * * *

UNITED STATES PATENT AND TRADEMARK OFFICE
CERTIFICATE OF CORRECTION

PATENT NO. : 12,229,775 B2
APPLICATION NO. : 17/970488
DATED : February 18, 2025
INVENTOR(S) : Burchard et al.

Page 1 of 1

It is certified that error appears in the above-identified patent and that said Letters Patent is hereby corrected as shown below:

On the Title Page

Item (73), in Column 1, in "Assignee", Line 1, delete "&Co." and insert -- & Co. --, therefor.

In the Claims

In Column 10, in Claim 14, Line 11, delete "claim 13," and insert -- claim 12, --, therefor.

Signed and Sealed this
Thirteenth Day of May, 2025

Coke Morgan Stewart
*Acting Director of the United States Patent and Trademark Office*